United States Patent [19]

Grögler et al.

[11] Patent Number: 4,663,415

[45] Date of Patent: May 5, 1987

[54] PROCESS FOR THE PREPARATION OF STABILIZED POLYAMINES, STABILIZED POLYAMINES WITH RETARDED REACTIVITY AND THEIR USE FOR POLYURETHANE PRODUCTION

[75] Inventors: Gerhard Grögler, Leverkusen; Richard Kopp, Cologne; Heinrich Hess, Leverkusen; Werner Rasshofer, Cologne, all of Fed. Rep. of Germany

[73] Assignee: Bayer Aktiengesellschaft, Leverkusen, Fed. Rep. of Germany

[21] Appl. No.: 759,818

[22] Filed: Jul. 29, 1985

[30] Foreign Application Priority Data

Aug. 8, 1984 [DE] Fed. Rep. of Germany ....... 3429149

[51] Int. Cl.$^4$ .................. C08G 18/32; C08G 18/79
[52] U.S. Cl. ........................ 528/61; 528/62; 528/63; 528/64; 252/182
[58] Field of Search .................. 528/61–64, 528/73

[56] References Cited

U.S. PATENT DOCUMENTS

| | | | |
|---|---|---|---|
| 3,004,939 | 10/1961 | Varvaro | 260/22 |
| 3,105,062 | 9/1963 | Graham et al. | 260/75 |
| 3,384,680 | 5/1968 | Lussow | 260/830 |
| 3,396,116 | 8/1968 | Adams et al. | 252/182 |
| 3,396,117 | 8/1968 | Schuetze | 252/182 |
| 3,575,882 | 4/1971 | Vandegaer et al. | 252/316 |
| 3,607,776 | 9/1971 | Santo et al. | 252/316 |
| 3,681,290 | 8/1972 | Meckel et al. | 260/77.5 |
| 3,791,980 | 2/1974 | Goldsmith | 252/188.3 |
| 3,891,606 | 6/1975 | Kogon | 260/77.5 |
| 3,920,617 | 11/1975 | Hirosawa | 260/77.5 |
| 3,926,919 | 12/1975 | Finelli | 260/75 |
| 4,076,774 | 2/1978 | Short | 264/252 |
| 4,193,889 | 3/1980 | Baatz | 252/316 |
| 4,208,507 | 6/1980 | Stutz | 528/64 |
| 4,495,081 | 1/1985 | Vanderhider et al. | 252/182 |
| 4,587,275 | 5/1986 | Kopp | 521/163 |

FOREIGN PATENT DOCUMENTS 1103202 2/1968 United Kingdom .
1355396 6/1974 United Kingdom .

Primary Examiner—Herbert S. Cockeram
Attorney, Agent, or Firm—Gene Harsh; Joseph C. Gil

[57] ABSTRACT

This invention relates to a process for the production of solid polyamines stabilized by a polyadduct covering and showing retarded reactivity comprising reacting (1) one or more solid organic polyamines in particulate form, said polyamines containing at least two primary and/or secondary amino groups and having melting points above 50° C., and (2) from 0.1 to 25 equivalent % of isocyanate per amine equivalent of a water insoluble, difunctional and/or higher functional polyisocyanate, said reaction being conducted at a temperature below the melting point of said solid polyamine, and being conducted in the presence of (3) a liquid medium selected from the group consisting of (a) organic compounds containing two or more hydroxy groups and having molecular weights of from 62 to 10,000, (b) plasticizers, (c) water, and (d) mixtures thereof to form a suspension of polyadduct-covered stabilized polyamines in the liquid medium.

13 Claims, No Drawings

PROCESS FOR THE PREPARATION OF STABILIZED POLYAMINES, STABILIZED POLYAMINES WITH RETARDED REACTIVITY AND THEIR USE FOR POLYURETHANE PRODUCTION

SUMMARY OF THE INVENTION

The present invention relates to a process for the preparation of solid polyamines with retarded reactivity which have been stabilized by a coating of polyadduct, characterized by the reaction of solid, finely divided polyamines with water-insoluble, difunctional and/or higher functional polyisocyanates in a quantity of from 0.1 to 25 equivalents % of NCO per amine equivalent in a liquid medium of difunctional and/or higher functional polyols and/or plasticizers and/or water (optionally in the presence of apolar or only slightly polar solvents) to form a suspension of stabilized polyamines with retarded reactivity coated by a polyadduct. The stabilized polyamines, may, if desired, be isolated from the liquid medium, e.g., by filtration. The isolated, stabilized polyamines may subsequently be suspended in polyols and/or polyamines or in prepolymers containing isocyanate groups to form polyurethane reactive systems with increased pot life and increased stability in storage.

According to the invention, the polyamines coated with polyadduct may also be in a finely divided form, preferably suspended in liquid or low melting, relatively high molecular weight polyhydroxyl compounds and/or relatively high molecular weight polyamino compounds and/or isocyanate prepolymers. These solid, suspended polyamines have been subjected to a reaction of 0.1 to 25 equivalents % of their amino groups with polyisocyanates. The polyadduct-coated polyamines obtained have a higher cross-linking temperature and slower reaction with polyisocyanates than the non-stabilized polyamines.

The invention further relates to the use of the stabilized polyadduct-covered polyamines, preferably in the form of suspensions in plasticizers and/or relatively high molecular weight, low melting polyhydroxyl compounds and/or relatively high molecular weight polyamines, as reaction components for the production of polyurethanes. These stabilized polyamines are useful in particular as reactants in hardenable polyurethane reactive systems which have long term storage stability. The stabilized polyamines or their suspensions are preferably mixed with isocyanate prepolymers to form storage-stable, heat-hardenable one-component reactive systems.

BACKGROUND OF THE INVENTION

The production of polyurethane urea elastomers from polyisocyanates, relatively high molecular weight polyhydroxyl compounds and aromatic diamines is known. In order to obtain acceptable processing times for reactive systems from such starting components, the reactive aromatic isocyanates (which are the ones most commonly used industrially) are advantageously reacted with relatively inert diamines. The diamines which have proved to be particularly suitable for this purpose are those aromatic diamines in which the basicity and hence the reactivity with isocyanates has been reduced. This lowering of the reactivity may be achieved by the introduction of suitable "obstructive" substituents which lower the nucleophilic character or have a steric action. Examples of such substituents include halogen: e.g., as in 3,3'-dichloro-4,4'-diaminodiphenylmethane (MOCA) or 3,5-diamino-4-chloro-1-alkylbenzene (German Offenlegungsschrift No. 2,065,869); carboxylic acid esters: 3,5-diamino-4-chlorobenzoic acid alkyl esters (German Offenlegungsschrift No. 2,003,706) or 4,4'-diamino-3,3'-carbethoxydiphenylmethane (French Pat. No. 2,104,442); sulphonic acid amides: 3,5-diamino-4-alkyl-benzenesulphonic acid dibutylamide (European Pat. No. 0,037,029); S, S-S or S-R-S: 2,2'-diaminodiphenyldisulphide (German Offenlegungsschrift No. 2,435,872) or 1,2-bis-(2-aminophenylmercapto)-ethane (U.S. Pat. No. 3,920,617); and alkyl groups: 4,4'-diamino-3,3',5,5'-tetramethyldiphenylmethane (German Offenlegungsschrift No. 2,731,815) or 3,5-diethyl-2,4-diaminotoluene.

The aromatic chain lengthening agents mentioned above, however, have only a limited, relatively short casting and pot life when used in combination with isocyanate-prepolymers and must therefore be used very quickly, especially at elevated temperatures. In many cases, the substituents required for reducing the amine reactivity "interfere" with the structures of the hard segments produced with the isocyanates, with the result that the reduced amine reactivity may be inevitably accompanied by a deterioration in the properties of the polyurethanes.

U.S. Pat. No. 3,891,606 discloses the crosslinking of isocyanate prepolymers obtained from polyhydroxyl compounds and an excess of polyisocyanates with aromatic diamines whose reactivity with isocyanate groups has been reduced by complex formation with certain alkali metal salts. The disadvantage of this method is that it is limited to two particular aromatic diamines. Moreover, complex formation between the aromatic diamine and the alkali metal salt must be carried out in a separate process step.

Little work has been done relative to the production of polyurethane ureas by the reaction of relatively high molecular weight polyisocyanates with aromatic diamines in heterogeneous phase.

German Auslegeschrift No. 1,122,699 relates to a process for the production of polyurethane elastomers by cross-linking liquid isocyanate prepolymers by a reaction with mixtures of primary diamines and compounds containing several hydroxyl groups, the cross-linking being accompanied by shaping. In this process, a dispersion of a pulverulent, crystalline diamine in a liquid polyester or polyether containing several hydroxyl groups or in castor oil is introduced into the prepolymer at a temperature below the melting point of the diamine. The mass is hardened in the mixture at temperatures above the melting point of the diamine.

A process for the production of polyurethane ureas is described in U.S. Pat. No. 3,105,062. In this process, an aromatic diamine is added in the form of a finely milled powder to an isocyanate prepolymer. The reaction mixture obtained, which is initially a two-phase system, changes into a reaction melt only in the course of solidification at elevated temperature. Products which are not homogeneous in composition are frequently obtained due to lack of sufficiently thorough mixing.

In the processes according to German Auslegeschrift No. 1,122,699 and U.S. Pat. No. 3,105,062, "amine cross-linking" takes place in the liquid phase at the appropriate temperatures. The disadvantage of these processes is the high temperature required for converting the components into the liquid state, especially when high melting diamines are used, such as 1,5-naphthylene diamine (m.p. = 189° C.) or 4,4'-diaminodiphenylether (m.p. = 186° C.). It has been found that considerable decomposition reactions occur in the polyurethane under these conditions, with the result that the mechanical properties of the end products undergo changes which cannot be controlled. Moreover, the storage stability of these heterogeneous reaction mixtures is very limited at room temperature, amounting only to several hours. Depending on the choice of the aromatic diamine and especially of the relatively high molecular weight polyisocyanate (isocyanate prepolymer based on polyether or polyester), a continuous increase in viscosity takes place and the substance changes into a pasty form and finally to a solid phase which can no longer be used.

The encapsulation of amines is known, e.g., from U.S. Pat. Nos. 3,396,116 and 3,396,117. The wall of the capsule or shell consists of water-soluble alginates, optionally in combination with other polymers such as polyvinyl alcohol, polyethylene oxides, polyacrylates or gelatin, which may subsequently be afterhardened.

According to U.S. Pat. No. 3,384,680, liquid polyamines are bound to finely divided, absorbent materials and subsequently sealed and used for epoxide formulations.

According to U.S. Pat. No. 3,791,980, electrically conductive amines, e.g., diethylamine, are extruded under high tension through nozzles to form charged, round droplets which are then enclosed in liquid, fusible material.

German Offenlegungsschrift No. 3,224,456 describes a microencapsulation of water-insoluble, liquid polyamines (optionally in the presence of water-soluble protective colloids) with water-soluble bisulphite adducts of polyisocyanates in aqueous solution, and the use of such microencapsulated, liquid polyamines in the preparation of polyurethane resin formulations.

German Offenlegungsschrift No. 3,224,454 describes the microencapsulation of water-insoluble substances (e.g., color producing components for reactive carbon paper) by encapsulation with polyurea from liquid polyamines and water-soluble polyisocyanate derivatives in aqueous solution, optionally in the presence of protective colloids (see also U.S. Pat. Nos. 3,575,882, 3,607,776 and 4,076,774 and German Offenlegungsschrift No. 2,655,048).

Finally, a process for the preparation of encapsulated aromatic diamines is described in Soviet Pat. No. 535,289. In this process, the aromatic diamine used is subjected to an interaction with subequivalent quantities of diisocyanate in the presence of a 6:1 hexane/ethyl acetate mixture at room temperature. These "encapsulated diamines" were claimed as hardeners for epoxide resins, but this literature does not show to what extent the polyamines, which are modified in a special solvent mixture and must first be isolated from them, are reduced in their isocyanate reactivity.

DESCRIPTION OF THE INVENTION

According to the present invention, on the other hand, solid polyamines which have been stabilized by encapsulation or coating with polyisocyanate addition products (i.e., polyadducts) and have a retarded reactivity, are obtained by the reaction of the solid polyamines with difunctional and/or higher functional polyisocyanates directly in a polyhydroxyl compound and/or a plasticizer and/or water. The encapsulation consists basically of a thin layer of polyaddition products (polyureas) formed by only a minor proportion of the amine groups reacting on the surface of the solid polyamines (e.g., reaction of 0.1 to 25% of the amine groups). Due to the stabilization reaction by encapsulation with polyadduct, the polyamine particles obtained cannot react with additional polyisocyanates in polyurethane reactive systems until the "thickening temperature" is exceeded. They may react, e.g., as a result of bursting of the polyadduct covering, destruction of the covering by shearing forces, increased diffusibility of the polyamines through the polyadduct layer or even dissolving of the polyadduct layer by the action of polar solvents.

The stabilized polyamines are preferably prepared by a reaction of the finely divided, suspended polyamines in relatively high molecular weight and optionally low molecular weight polyhydroxyl compounds and/or in plasticizers, optionally with the addition of organic solvents. It is less practical to first isolate the stabilized, encapsulated polyamines by filtration, e.g., from the plasticizers, and to subsequently suspend them in low molecular weight or relatively high molecular weight polyhydroxyl compounds and/or relatively high molecular weight polyamines and/or isocyanate prepolymers. Any organic solvents used in the process may be removed at not too high a temperature (below the thickening temperature) by distilling (under vacuum).

The stabilized polyamines still contain at least 75%, preferably more than 85%, and especially more than 90% but at the most 99.9%, preferably not more than 99.8% and in particular not more than 99.5% of the (primary and/or secondary) amino groups originally present in the unmodified polyamines.

Mixtures of the stabilized polyamines with isocyanate prepolymers have a considerably lower reaction rate and considerably higher storage stability than mixtures of isocyanate prepolymers with unstabilized, solid polyamines. These long term storage stable reactive mixtures may be hardened simply by heating, a rapid polyaddition reaction taking place above the "thickening temperature". This "thickening temperature" may be varied by a simple variation in the reaction conditions, e.g., the temperature employed for the encapsulation reaction, the choice of reaction medium or the nature and quantity of isocyanate stabilizers used for stabilization, so that a product can be made having higher storage stability at relatively high storage temperatures. The optimum conditions of stabilization for forming solid, polyadduct encapsulated polyamines can be determined individually for any polyurethane reactive mixtures (e.g., one-component polyurethane mixtures) by a simple test series.

The long-term storage-stable, highly fluid or in some cases easily melted heterogeneous reactive systems obtained from the stabilized polyamines may also be hardened by the addition of polar solvents (e.g., dimethylformamide). In some cases even the action of powerful shearing forces is sufficient although this is a less widely applicable form of polyurethane production. Heat hardening in which the reactive systems according to the invention may be reacted at a relatively low temperature (above the thickening temperature, preferably ≧55° C., most preferably at 100° to 140° C.) is preferred and can be used for the production of high quality polyurethane (urea) elastomers, coatings, laminates, adhesives or cellular elastomers.

The present invention thus relates to a process for the preparation of solid polyamines with retarded reactivity which have been stabilized by a polyadduct covering characterized in that solid polyamines having at least two primary and/or secondary amino groups (preferably diprimary diamines, and in particular aromatic diamines), having melting points above 50° C. (preferably above 80° C.), are reacted in a finely divided or particle form (e.g., with a particle size of from 0.5 to 200 μm, preferably from 1 to 50 μm) with water-insoluble, difunctional or higher functional, polyisocyanates as stabilizers in a quantity of from 0.1 to 25 equivalent % of NCO per amine equivalent (preferably from 0.2 to 15 equivalent %, and most preferably from 0.5 to 10 equivalent %), in a liquid medium of polyhydroxyl compounds having molecular weights of from 62 to 10,000 (preferably relatively high molecular weight polyhydroxyl compounds having molecular weights of from 400 to 10,000) and/or plasticizers and/or water, optionally in the presence of apolar or only slightly polar solvents (preferably based on aliphatic, cycloaliphatic or aromatic hydrocarbons, halogenated hydrocarbons, ethers, ketones or esters), at temperatures below the melting point of the polyamines (preferably temperatures of up to about 70° C. and most preferably at 0° to 50° C.), to form a suspension of polyadduct-covered, stabilized polyamines in the liquid medium. Any solvents used may be removed. The stabilized polyamines may be isolated and the isolated, stabilized polyamines may be suspended in preferably relatively high molecular weight polyhydroxyl compounds and/or relatively high molecular weight polyamino compounds.

The present invention also relates to stabilized, solid, finely divided polyamines with retarded reactivity which have been covered with a polyadduct by a partial surface reaction with water-insoluble difunctional and/or higher functional polyisocyanates, (preferably polyisocyanates having a functionality higher than 2.1), which polyamines have a residual amino group content of at least 75% (preferably at least 85% and in particular at least 90%) but less than 99.9% (preferably less than 99.8% and in particular less than 99.5%) of the amino groups originally present, in suspension in polyhydroxyl compounds having molecular weights of from 62 to 10,000 (preferably 500 to 6000), and/or polyamino compounds having molecular weights of from 60 to 10,000, (preferably 500 to 6000, and containing aromatic amino groups), and/or plasticizers. The suspension may contain a mixture of low molecular weight and/or relatively high molecular weight polyhydroxyl compounds and/or low molecular weight and/or relatively high molecular weight polyamino compounds.

Admixture of the low molecular weight and/or polyamines is preferably carried out after the stabilization reaction of the solid polyamines with the subequivalent quantities of polyisocyanates.

The present invention further relates to the use of the polyadduct covered, stabilized, solid polyamines with retarded reactivity in the form of one-component polyurethane (PU) reactive mixtures, for the production of polyurethanes (polyurethane ureas).

The polyamines with retarded reactivity may be used for processes of polyurethane production in which the reaction time (pot life) is increased (e.g., in casting systems) and for building up (one-component) polyurethane reactive systems which have long-term storage stability at low temperatures and are not reactive until activated by temperature or by the addition of polar solvents. By "one-component polyurethane reactive systems" are meant mixtures which already contain the reactive components in such quantities that the desired polymeric polyurethanes or polyurethane ureas can be directly obtained by "hardening", e.g., heat hardening.

If the stabilized polyamines are only used in limited proportions in addition to non-stabilized polyamines, it is possible to carry out a stepwise synthesis of polyurethane or polyurethane ureas since the non-stabilized polyamines react first, with marked increase in viscosity and polymerization. The stabilized polyamines only react thereafter. The non-stabilized polyamines used for this purpose are preferably relatively high molecular weight polyamines although proportions of low molecular weight diamines or polyamines may also be used.

Thus the invention also relates to a process for the production of polyurethane (urea)s from (A) low molecular weight and/or relatively high molecular weight compounds containing isocyanate reactive groups.
(B) low molecular weight and/or relatively high molecular weight polyisocyanates and/or isocyanate prepolymers in which the isocyanates may be partly or completely present in blocked form,
(C) optionally polyurethane catalysts and
(D) optionally conventional auxiliary agents and/or additives and/or monofunctional chain breaking agents, wherein component (A) is a suspension prepared according to the present invention.

The isocyanate groups from (B) and the reactive groups from (A) may be used in equivalent ratios of A:B within the range of from 1.5:1 to 0.8:1, preferably from 1.25:1 to 0.9:1.

The hardenable fluid or readily melted polyurethane reactive systems are converted into solid or foamed polyurethane resins, coatings or films by heat, shearing forces and/or polar solvents.

When relatively high molecular weight polyamines are used, they are not used from the start as liquid medium for the solid polyamines but are added subsequently to the stabilized polyamine suspensions in polyols and/or plasticizers or are used as the sole suspension medium for stabilized polyamines which have previously been isolated (e.g., by filtration).

According to a preferred embodiment, the stabilized, polyadduct encapsulated or covered polyamines which are suspended, e.g., in relatively high molecular weight polyols, are suspended in relatively high molecular weight isocyanate prepolymers, the quantity of reactive hydrogen atoms and isocyanate groups being chosen, for example within equivalent ratios ranging from 1.25:1 to 0.8:1, so that high molecular weight polyurethanes or polyurethane ureas are formed when these storage stable, one-component mixtures are made to undergo complete reaction by heating.

The starting components used for the preparation of the solid polyamines which are stabilized according to the invention may be any diamines or polyamines or any mixtures thereof containing at least two primary and/or secondary amino groups, provided they have a melting point above 50° C., preferably ≧80° C. These may consist of aliphatic, cycloaliphatic, araliphatic, heterocyclic or, preferably, aromatic polyamines (the amines are referred to in the present application as polyamines). Examples of such compounds are listed below, together with their melting points.

| Polyamines | Melting point (°C.) |
| --- | --- |
| Ethylene glycol-bis-(p-aminobenzoic acid ester | 210 |
| 2,2'-diaminoazobenzene | 134 |
| 3,3'-diaminoazobenzene | 156 |
| 4,4'-diaminoazobenzene | 241–243 |
| 2,3-diaminobenzoic acid | 190–191 |
| 2,4-diaminobenzoic acid | 140 |
| 2,5-diaminobenzoic acid | 200 |
| 3,4-diaminobenzoic acid | 210 |
| 3,5-diaminobenzoic acid | 240 |
| 2,2'-diaminobenzophenone | 134–135 |
| 4,4'-diaminobenzophenone (preferred) | 239–241 |
| 4,4'-diaminodiphenylamine | 158 |
| 3,4-diaminophenol | 167–168 |
| 4,4'-diaminostilbene | 227–228 |
| 2,2'-diaminostilbene | 176 |
| 4,4'-diaminotriphenylmethane | 139 |
| Naphthylenediamine-(1,5) (preferred) | 189.5 |
| Naphthylenediamine-(2,6) (preferred) | 217–218 |
| Naphthylenediamine-(2,7) (preferred) | 160 |
| p-phenylenediamine (preferred) | 139–141 |
| 1,2-diaminoanthraquinone | 289–291 |
| 1,5-diaminoanthraquinone | 312–313 |
| 1,4-diaminoanthraquinone | 265–268 |
| 2,6-diaminoanthraquinone | 325 |
| 3,6-diaminoacridine | 267–270 |
| 4,5-diaminoacenaphthene | 140–145 |
| 4,4'-diaminodiphenylether (preferred) | 188–190 |
| 3,3'-diaminodiphenylsulphone | 150–153 |
| 3,3'-dimethoxybenzidine | 136–137 |
| 4,4'-diaminodiphenylsulphone | 174–176 |
| 2,3-diaminofluorene | 192–195 |
| 2,5-diaminofluorene | 174–176 |
| 2,7-diaminofluorene | 165.5–167 |
| 9,10-diaminophenanthrene | 164–166 |
| 3,6-diaminodurene | 151–154 |
| p-xylene-bis-(o-aminothiophenyl)-ether | 136–138 |
| p,p'-diaminobenzanilide (preferred) | 206–208 |
| 4,3'-diaminobenzanilide (preferred) | 170–172 |
| 3,4'-diaminobenzanilide (preferred) | 153–156 |
| 4,3'-diamino-4'-chlorobenzanilide | 205–209 |
| 4,2'-diamino-4'-chlorobenzanilide | 175–177 |
| 4-chloro-3,5-diaminobenzoic acid ethyl ester (preferred) | 137 |
| 4-chloro-3-aminobenzoic acid-(4-chloro-3-amino-phenylester) | 147–148 |
| 4-chloro-3-aminobenzoic acid-(3-chloro-4-amino-phenylester) | 145–146 |
| 4-aminobenzoic acid-(3-chloro-4-amino-phenylester) | 138–140 |
| Succinic acid-di-(3-chloro-4-amino)-phenylester | 196–198 |
| Ethyleneglycol-bis-(4-chloro-3-amino)-benzoic acid ester | 171 |
| 3,3'-dichloro-4,4'-diaminodiphenyl carbonate | 166–168 |
| 4,4'-dichloro-3,3'-diaminodiphenyl carbonate | 192–193 |
| 4-methyl-3,5-diaminobenzoic acid ethyl ester (preferred) | 142–144 |
| 3,5-diaminobenzoic acid methyl ester | 133–135 |
| 4,4'-diamino-diphenylmethane-3,3'-dicarboxylic acid dimethyl ester (preferred) | 146 |
| 1,4-bis-(sulphanilyl)-piperazine | 331–332 |
| 4,4'-diamino-diphenylmethane-3,3'-dicarboxylic acid | 245 |
| N,N'—di(p-aminobenzenesulphonyl)-diaminoethane | 200–205 |
| p,p'-diaminobenzene sulphonanilide (preferred) | 137–138 |
| N,N'—di(2-anilino)-urea (preferred) | 305 |
| N,N'—di(β-anilinoethyl)-urea | 130–135 |
| 2,5-dimethyl-m-xylylenediamine | 123 |
| 3,3'-dimethyl-4,4'-diamino-diphenyl | 130 |
| 4,4'-diamino-diphenylethane | 138 |
| 1,4-diamino-cyclohexane (trans-isomer) | 74–75 |
| 4,4'-diamino-dicyclohexylmethane (trans/trans-isomer) | 65–70 |

If the solid, finely divided polyamines are to be suitable for the stabilization reaction, they must only dissolve to a slight extent (e.g., <3%, preferably <1%), in the polyhydroxyl compounds, plasticizers and, if used, solvents which constitute the liquid medium for the stabilization reaction of the polyamines. After the stabilization reaction with polyisocyanates has been carried out, the stabilized polyamine particles which are covered with polyureas on their surface are considerably less soluble and have higher softening temperatures.

The solid, finely divided polyamines are stabilized by reacting with subequivalent quantities (at least 0.1 equivalent %, preferably at least 0.2% and most preferably at least 0.5% but at the most 25%, preferably not more than 15% and most preferably not more than 10 equivalent %), based on the amino groups of water-insoluble di- and/or polyisocyanates (which are liquid or may be capable of solidifying or may even be resinous but are in that case used in a dissolved form), in particular higher functional polyisocyanates, having an average isocyanate functionality greater than 2.1, preferably greater than 2.5. Biuretized, dimerized, trimerized, allophanatized or carbodiimidized polyisocyanates or polyisocyanates modified with polyols are preferred. Particularly preferred are (cyclo)-aliphatic or araliphatic, di- and/or higher functional polyisocyanates. Mixtures of the above mentioned polyisocyanates may also be used. The polyisocyanates and their modification products generally have average molecular weights of up to 850, preferably up to 750 and in particular up to 550, and preferably not less than 168.

The following are examples: Hexamethylene diisocyanate, undecamethylene diisocyanate, dodecamethylene diisocyanate, lysine methyl ester diisocyanate, methane diisocyanate, isophorone diisocyanate, cyclohexane diisocyanates, $\alpha,\alpha,\alpha',\alpha'$-tetramethyl-m/p-hexahydroxylylene-diisocyanates, 4-isocyanatomethyloctane-1,8-diisocyanate, hexahydrotolylene diisocyanates, dicyclohexylmethane diisocyanate, 1,6,11-triisocyanatoundecane, substituted 1,5-diisocyanatopentane derivatives according to European Pat. No. 77,105 (e.g., 1-methyl-1,5-pentane diisocyanate) or their oligomeric derivatives (e.g., according to European Pat. No. 77,104), m/p-xylylene diisocyanate or $\alpha,\alpha,\alpha',\alpha'$-tetramethyl-xylylene diisocyanates (m- or p-isomers). Polyisocyanates having an isocyanate functionality higher than 2 (in particular above 2.1) and containing uretdiene, biuret, carbodiimide, allophanate, isocyanate, or urethane groups are particularly preferred. Those modified isocyanates based on the above-mentioned diisocyanates, in particular those based on hexamethylene diisocyanate, isophorone diisocyanate or dicyclohexylmethane diisocyanate, as well as tolylene diisocyanates are most preferred.

Aromatic, low molecular weight diisocyanates, e.g., tolylene diisocyanates or diphenylmethane diisocyanates, are often less suitable. It is preferable to use relatively high molecular weight aromatic polyisocyanates with isocyanate functionalities above 2.1, which constitute isocyanate prepolymers of higher than difunctional polyols or polyol mixtures and the above-mentioned diisocyanates, or trimers of the above-mentioned diisocyanates or mixed trimers of tolylene diisocyanates or diphenylmethane diisocyanates and aliphatic diisocyanates such as hexanediisocyanate, dicyclohexylmethane diisocyanates or isophorone diisocyanate. Diisocyanates carrying long chained alkyl substituents are also suitable, e.g., $C_{12}$-$C_{18}$-alkyl-2,4-benzene diisocyanate.

The reaction of the solid polyamines on their surface with the polyisocyanates used for stabilizing them is carried out in a liquid medium which will not dissolve or will not readily dissolve the solid polyamines. Suitable media for this purpose include, water and plasticizers such as adipic acid dialkyl esters or trialkyl phosphates, in particular long chain trialkyl esters which have a relatively low polarity, such as stearyl esters. Proportions of relatively volatile, less polar solvents (e.g., aliphatic hydrocarbons) may also be added and optionally removed after the encapsulation produced by the reaction on the surface.

Preferably, however, the stabilization reaction is carried out directly in a relatively high molecular weight polyol, (i.e., having a molecular weight of from 400 to 10,000). The suspension or paste obtained is then generally used without separation of the suspension medium. Suspensions having a proportion by weight of stabilized, solid polyamine to liquid medium in the range of from 20:80 to 80:20, in particular from 40:60 to 60:40, are preferred.

The polyols used for the liquid medium may be any of the type generally known and used in the production of polyurethanes and may be the same as those used for the preparation of the isocyanate functional prepolymers. Such polyols include polyesters and polyethers.

Since the polyols used as liquid medium for the solid, finely suspended polyamines, compete with the polyamines in the reaction with the stabilizer polyisocyanates, they should as far as possible be liquid at room temperature (or melt at temperatures $\leq 60°$ C.) and have a low viscosity, should have little power to dissolve the suspended polyamines and should be markedly different in their hydroxy group reactivity from the amine reactivity. For these reasons, polyols having secondary hydroxy groups, such as polyoxypropylene polyols, are generally preferred. The less reactive the amines, the more preferred are the polyols which carry predominantly secondary hydroxy groups since these secondary hydroxy groups react more slowly with isocyanates.

In solid aliphatic, cycloaliphatic or araliphatic polyamines, the reactivity of the amino groups is so much greater than that of the hydroxy groups that it is virtually immaterial whether the polyols contain primary or secondary hydroxy groups.

In aromatic polyamines, the difference in reactivity between the NH$_2$ groups and the hydroxy group is less and the polyols used in that case preferably carry at least a proportion of secondary hydroxy groups. If the aromatic polyamines have been suitably substituted so that they are even less reactive than the unsubstituted diamines, the polyols used preferably have predominately secondary hydroxyl groups.

In practically all cases, however, both polyols with primary hydroxy groups and polyols with secondary hydroxy groups may be used as suspension medium. If the differences in reactivity are small, however, the hydroxyl groups increasingly take part in the reaction with the polyisocyanates. The stabilization reaction with encapsulation of the diamines may be accompanied by a reaction in which polyols are linked together, with an increase in viscosity, or occasionally also attached to the diamine particles by way of the polyisocyanates. These reactions could explain the surprising observation that the sedimentation stability of such suspensions may be improved after the stabilization reaction in polyols.

Polyether polyols and polyester polyols are preferred among the relatively high molecular weight polyols, in particular polyether polyols such as polyoxypropylene polyols or polyoxyethylene/oxypropylene polyols, preferably with secondary hydroxy groups.

During or after the stabilization reaction, low molecular weight polyols (molecular weights 62 to 399) may be added. These low molecular weight polyols act as chain lengthening agents in the reaction to produce high polymer polyurethanes. Since the desired improved properties of the polyurethanes are in many cases obtained by the use of difunctional or higher functional amines, however, less than 80% of the amine equivalents, preferably less than 50%, should generally be replaced by hydroxy groups from low molecular weight polyols. This applies both to suspension and to the whole reactive system used for polyurethane production.

The stabilization reaction is carried out by reacting the solid polyamine with a suitable stabilizing polyisocyanate in the liquid medium. The polyamine may first be suspended in the medium, and then mixed with the polyisocyanate or the polyisocyanate may first be finely divided or dissolved in the suspension medium before the solid polyamine is suspended therein.

The "isocyanate stabilizers" are put into the process in a quantity of from 0.1 to 25 equivalent % of NCO per equivalent of amine in the polyamine, preferably 0.2 to 15 equivalent %, and in particular from 0.5 to 10 equivalent %.

Although polyurea encapsulation may be carried out with even higher proportions of NCO, e.g., equivalent % of NCO per amine equivalent, the proportions of reactive amino groups left in the stabilized polyamines are then too greatly reduced in the polyurethane reactive systems to be practical.

The encapsulation reactions are carried out at temperatures below the melting point of the polyamine, generally below 70° C., preferably at 0° to 50° C.

The reactive systems according to the invention containing the stabilized polyamines are required to have a long pot life (casting and working time) at room temperature or slightly elevated temperatures (e.g., 50° to 70° C.) and at the same time are required to undergo rapid cross-linking at elevated temperatures (e.g., above 100° C.). The conditions required in practice may be controlled by the chemical constitution of the "isocyanate" stabilizers for the diamines. If a certain limiting quantity of stabilizer is exceeded, cross-linking is unsatisfactory under the usual heating conditions (110° to 140° C.). It is therefore advisable to determine the optimum quantity of isocyanate stabilizer to be added in the required formulation and then to determine the hardening temperature or hardening time which is obtainable with a sufficient working life at room temperature or moderately elevated temperature. The stabilizing effect of low molecular weight, aromatic diisocyanates and increases is generally less than that of aliphatic diisocyanates and increases with increasing functionality of the isocyanates. Triisocyanates generally have a more powerful effect than diisocyanates. The stabilizing effect also generally increases with the quantity of stabilizer used.

It is preferred to carry out the "stabilization reaction" in a medium which can be used after the reaction as a reaction component for synthesizing high molecular weight polyurethanes or polyurethane ureas. Polyols are therefore preferred as reaction medium. For certain applications, e.g., in the coating sector, plasticizers may be used as medium, either alone or together with other substances. Solvents which are readily volatile but do not have a significant dissolving effect on the polyamines may be added but their addition is highly undesirable since they would subsequently have to be removed in an additional operation.

The reaction for stabilizing the polyamines with water-insoluble polyisocyanates may also be carried out in water as liquid medium if the polyamines are not dissolved therein to any significant extent. Water-insoluble polyisocyanates may be added for this purpose in the form of solutions in water-miscible solvents (e.g., tetrahydrofuran or dioxane) or in water-immiscible, inert solvents such as ethyl acetate or toluene. After the surface modification, the stabilized polyamines may be isolated by suction filtration and dried. Considerable quantities of water are retained in and on the particles so that when these are used in polyurethane reactive systems, a water/isocyanate reaction may take place, in most cases resulting in the formation of blisters. Such stabilized polyamines are therefore generally only suitable for the production of foamed or cellular polyurethanes.

The stabilized polyamine particles may in principle be isolated, e.g., from the plasticizers or polyols (for example, by filtration). The isolated particles may then be suspended in other polyols or in relatively high molecular weight polyamines. This procedure is, of course, complicated and less preferred but may in some cases be advantageous for preparing suspensions of stabilized polyamines of a certain type which cannot always be synthesized directly in the suspension medium, e.g., in relatively high molecular weight polyamines as direct suspension medium.

The stabilized polyamine suspensions are used in the production of polyurethanes. They may be used alone in combination with the isocyanate or isocyanate prepolymer component if they already contain all the required components with reactive hydrogen atoms in the stoichiometrically required quantity.

On the other hand, other compounds containing reactive hydrogen atoms may be used in addition to the stabilized polyamine suspensions (e.g., other relatively high molecular weight difunctional or higher functional polyols, relatively high molecular weight difunctional or higher functional polyamines (including polyhydrazides) and optionally other low molecular weight difunctional or higher functional compounds containing reactive hydrogen atoms, e.g., polyols, polyamines, polyamino alcohols, polyhydrazide compounds, and similar compounds known as chain lengthening agents or cross-linking agents).

The isocyanate component which may be used as low molecular weight difunctional or higher functional isocyanates or for the preparation of the low molecular weight or relatively high molecular weight prepolymers containing isocyanate groups may consist of aliphatic, cycloaliphatic, araliphatic, aromatic and/or heterocyclic polyisocyanates such as those disclosed in numerous publications for use in the synthesis of polyurethanes and described, for example, by W. Siefken in Justus Liebigs Annalen der Chemie 562, pages 75 to 136, 1949, and, for example, in German Offenlegungsschriften Nos. 2,854,384 and 2,920,501. The following are examples: Ethylene diisocyanate: 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl-cyclohexane; 2,4- and 2,6-hexahydrotolylene diisocyanate and mixtures of these isomers; hexahydro-1,3- and/or 1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures of these isomers; diphenylmethane-2,4'- and/or -4,4'-diisocyanate; naphthylene-1,5-diisocyanate; triphenyl methane-4,4',4''-triisocyanate; polyphenyl-polymethylene polyisocyanates obtainable by aniline-formaldehyde condensation followed by phosgenation, as described e.g., in British Pat. Nos. 874,430 and 848,671; perchlorinated aryl polyisocyanates as described in German Auslegeschrift No.1,157,601; polyisocyanates containing carbodiimide groups, as described in German Pat. No. 1,092,007; diisocyanates as described in U.S. Pat. No. 3,492,330; polyisocyanate containing allophanate groups as described in British Pat. No. 994,890, Belgian Pat. No. 761,626 and published Dutch Patent Application No. 7,102,524; polyisocyanates containing isocyanurate groups as described in German Pat. Nos. 1,022,789, 1,222,067 and 1,027,394 and in German Offenlegungsschriften Nos. 1,929,034 and 2,004,048; polyisocyanates containing urethane groups as described in Belgian Pat. No. 752,261 or in U.S. Pat. No. 3,394,164; polyisocyanates containing acylated urea groups according to German Pat. No. 1,230,778; polyisocyanates containing biuret groups as described in German Pat. No. 1,101,394, British Pat. No. 889,050 and French Pat. No. 7,017,514; polyisocyanates prepared by telomerization reactions, as described in Belgian Pat. No. 723,640: polyisocyanates containing ester groups, such as those mentioned in British Pat. Nos. 965,474 and 1,072,956, U.S. Pat. No. 3,567,763 and German Pat. No. 1,231,688; and reaction products of the above-mentioned isocyanates with acetals according to German Pat. No. 1,072,385. Mixtures of these polyisocyanates may also be used.

The readily available polyisocyanates are generally particularly preferred, e.g., 2,4- and 2,6-tolylene diisocyanate and mixtures of these isomers ("TDI"); polyphenyl-polymethylene polyisocyanates which may be prepared by aniline-formaldehyde condensation followed by phosgenation ("crude MDI"); 4,4'- and/or 2,4'-diphenylmethane-4,4'-diisocyanate; and polyisocyanates containing carbodiimide groups, urethane groups, allophanate groups, isocyanurate groups, urea groups or biuret groups ("modified polyisocyanates").

The polyisocyanates or the isocyanate prepolymers prepared from the polyisocyanates and the above-mentioned, relatively high molecular weight and/or low molecular weight polyols should be present in a liquid form for their reaction with the finely divided, suspended aromatic diamine.

The preparation of isocyanate prepolymers is known and has been described, for example, in German Offenlegungsschriften Nos. 2,854,384 and 2,920,501. The polyisocyanates or isocyanate prepolymers may be used in a "blocked" form, that is to say with their isocyanate groups partly or completely blocked with blocking agents (such as ketoximes, lactams, malonic esters or phenols).

The polyisocyanates may also be used in a stabilized form with retarded reactivity as obtained by the processes according to German Offenlegungsschriften Nos. 3,112,054, 3,228,723, 3,228,724, 3,228,670 and 3,230,757 and European Pat. No. 2,230,757.

Depending on the purpose for which the end products are to be used, the isocyanate prepolymers may be substantially linear (e.g., for use in elastomers) or branched (e.g., for coatings, films, lacquers or foams). Their content of free (or blocked) isocyanate groups is generally in the range of from 0.5 to 20% NCO but may be even higher, e.g., up to 25% NCO. The isocyanate content determines, for example, the "hardness" of the polyurethane resins. For elastomers, the isocyanate content is generally from 1 to 12%, preferably from 1.5 to 7.5%.

Relatively high molecular weight difunctional or higher functional polyhydroxyl compounds, with molecular weights from about 400 to 10,000, preferably from 500 to 6000, are suitable for use as starting components for the preparation of the low and/or relatively high molecular weight prepolymers containing isocyanate groups or as the liquid medium. These polyhydroxyl compounds may be polyesters, polyethers, polythioethers, polyacetals, polycarbonates or polyester amides containing at least two, preferably 2 to 4, hydroxyl groups, such as the compounds known for the production of homogeneous and cellular polyurethanes. Numerous examples of these compounds are given, for example, in German Offenlegungsschriften Nos. 2,920,501 and 2,854,384.

The hydroxyl polyesters suitable for this purpose may be, for example, reaction products of polyhydric (preferably dihydric alcohols with the optional addition of trihydric alcohols) and polybasic, (preferably dibasic) carboxylic acids, polycarboxylic acid anhydrides or polycarboxylic acid esters of lower alcohols. The polycarboxylic acids may be aliphatic, cycloaliphatic, aromatic and/or heterocyclic. They may be substituted, e.g., by halogen atoms, and/or they may be unsaturated. The following are examples: Succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; oleic acid; dimeric and trimeric fatty acids optionally mixed with monomeric fatty acids; dimethylterephthalate and terephthalic acid-bis-glycol esters. Examples of suitable polyhydric alcohols include ethylene glycol, propanediol-(1,2) and -(1,3), butanediol-(1,4) and -(2,3), hexanediol-(1,6), octanediol-(1,8), neopentyl glycol, 1,4-bis-hydroxymethylcyclohexane, 2-methyl-1,3-propanediol, glycerol, trimethylolpropane, hexanetriol(1,2,6), butanetriol-(1,2,4), trimethylolethane, pentaerythritol, quinitol, mannitol and sorbitol, 1,4,3,6-dianhydrohexitols, methyl glycoside, di-, tri-, tetra-, and polyethyleneglycol, di-, tri-, tetra- and polypropyleneglycol, and di-, tri-, tetra- and polybutyleneglycol. The polyesters may contain a proportion of carboxyl end groups. Polyesters of lactones such as $\epsilon$-caprolactone or hydroxycarboxylic acids, e.g., $\omega$-hydroxycaproic acid, may also be used.

Suitable polyethers for the purpose of the invention, containing at least two, generally two to eight, preferably two or three hydroxyl groups are of the type known per se and may be prepared, for example, by the polymerization of tetrahydrofuran and/or epoxides such as ethylene oxide, propylene oxide, butylene oxide, styrene oxide or epichlorohydrin, either on their own (e.g., in the presence of $BF_3$), or by addition of these epoxides, to starting components containing reactive hydrogen atoms, such as water, alcohols, aminoalcohols, amines, sugars and other known starters. Suitable starters include ethylene glycol, propanediol-(1,3) or -(1,2), trimethylolpropane, 4,4'-dihydroxy-diphenylpropane, aniline, ammonia, ethanolamine or ethylene diamine. Sucrose polyethers such as the compounds described, for example, in German Auslegeschriften Nos. 1,176,358 and 1,064,938 may also be used according to the invention. Examples include relatively high molecular weight polyoxyalkylene polyols (e.g., polyoxytetramethylene glycols) or ethoxylation and/or propoxylation products of low molecular weight diols, polyols, mono-, di- and polyamines. Examples include propoxylated trimethylolpropane, propoxylated ethylene diamine or linear or branched chain polypropylene glycol ethers which may contain a proportion of ethylene oxide either in statistical distribution or in blocks or in end positions. The polyesters used have molecular weights of from 400 to 10,000, preferably 600 to 6000. Polyethers which have been modified with vinyl polymers, such as those obtained, e.g., by the polymerization of styrene and acrylonitrile in the presence of polyethers (U.S. Pat. Nos. 3,383,351, 3,304,273, 3,523,093 and 3,110,695 and German Pat. No. 1,152,536) are also suitable, as are polybutadienes containing hydroxy groups. Polyethers having secondary hydroxy groups are preferred as the liquid medium.

Particularly to be mentioned among the polythioethers are the condensation products obtained by the condensation of thiodiglycol on its own and/or with other glycols, dicarboxylic acids, formaldehyde, aminocarboxylic acids or amino alcohols.

Suitable polyacetals are, for example, the compounds which may be prepared from glycols such as diethylene glycol, trimethylene glycol, 4,4'-dioxethoxy-diphenyldimethylmethane, hexanediol and formaldehyde. Polyacetals suitable for the purpose of the invention may also be obtained by the polymerization of cyclic acetals.

The polycarbonates containing hydroxyl groups are of the type known per se, which may be prepared, for example, by the reaction of diols such as propanediol-(1,3), butanediol-(1,4) and/or hexane-(1,6) or di-, tri- or tetraethylene glycol with diarylcarbonates such as diphenylcarbonate or with phosgene.

Suitable polyester amides and polyamides include, for example, the predominately linear condensates obtained from polybasic saturated and unsaturated carboxylic acids or their anhydrides and polyvalent saturated and unsaturated amino alcohols, diamines, polyamines or mixtures thereof.

Polyhydroxy compounds already containing urethane or urea groups and modified or unmodified natural polyols such as castor oil, carbohydrates or starches may also be used. Products of addition of alkylene oxides to phenol formaldehyde resins or to urea formaldehyde resins may also be used in the process according to the invention.

Polybutadienes containing hydroxyl end groups are suitable for the purpose of the invention as they give rise to products which are exceptionally elastic and resistant to hydrolysis. Polyhydroxyl compounds containing high molecular weight polyadducts or polycondensates or polymers in a finely dispersed form or in solution may also be used.

Polyhydroxyl compounds containing polyadducts are obtained when polyaddition reactions (e.g., reactions between polyisocyanates and aminofunctional compounds) or polycondensation reactions (e.g., between formaldehyde and phenols and/or amines) are carried out in situ in the above-mentioned hydroxyl-containing compounds.

Polyhydroxyl compounds modified with vinyl polymers, such as the compounds obtained, for example, by the polymerization of styrene and acrylonitrile in the presence of polyethers or polycarbonate polyols, are also suitable for the process according to the invention.

Representatives of these compounds which may be used according to the invention are described, for example, in High polymers, Vol. XVI, "Polyurethanes, Chemistry and Technology" by Saunders-Frisch, Interscience Publishers, New York, London, Vol. I, 1962, pages 32–42 and pages 44 and 54 and Vol. II, 1964, pages 5–6 and 198–199; Kunststoff-Handbuch. Vol. VII, Vieweg Höchtlen, publishers Carl-Hanser-Verlag, Munich, 1966, e.g., on pages 45 to 71; and German Offenlegungsschriften No. 2,854,384 and 2,920,501.

Polymers containing hydroxyl groups are also suitable polyols, e.g., copolymers of olefinically unsaturated monomers and olefinically unsaturated monomers containing active hydrogen. These are described, for example, in European Pat. No. 62,780, on page 5 and in the Examples. They are used for sealing, filling, adhesive or underfloor protective compounds.

Mixtures of the above-mentioned compounds containing at least two isocyanate reactive hydrogen atoms and having molecular weights of from 400 to 10,000 may, of course, also be used, e.g., mixtures of polyethers and polyesters.

Also useful for suspensions are low melting (<60° C.), relatively high molecular weight polyamines in the molecular weight range of from 400 to 10,000, preferably 500 to 6000, containing aromatic and/or aliphatic amino groups.

The relatively high molecular weight polyamino compounds containing aromatic amino groups and having molecular weights in the range of from 400 to 10,000, preferably from 500 to 6000, include in particular those polyamino compounds which may be obtained by hydrolysis (preferably alkaline hydrolysis) of the corresponding isocyanate prepolymers based on relatively high molecular weight polyhydroxyl compounds and excess aromatic diisocyanates. Examples of this process are contained in German Offenlegungsschriften Nos. 2,948,419, 3,039,600 and 3,112,118, European Pat. Nos. 61,627, 71,132 and 71,139. The first mentioned patent specification also mentions other processes known in the art for the preparation of aromatic amino compounds with relatively high molecular weight structure which are also suitable for the process according to the invention. The products obtained from the process described in German Offenlegungsschrift No. 2,948,419 and those described in the other cited specifications are preferably polyether polyamines but also include polyester, polyacetal, polythioether or polycaprolactone polyamines, particularly difunctional or trifunctional polyamines, which contain urethane groups (from the reaction of the corresponding relatively high molecular weight polyhydroxyl compounds with excess polyisocyanates) and carry the amino groups on the residue of what was previously the polyisocyanate. The aromatic, relatively high molecular weight polyamines may, however, also be prepared by other methods, e.g., by the reaction of isocyanate prepolymers with excess quantities of aminophenyl ethylamine or other diamines according to German Auslegeschrift No. 1,694,152. Another method of synthesis, described in French Pat. No. 1,415,317, consists of converting the isocyanate prepolymers with formic acid into the N-formyl derivatives and saponifying these. The reaction of isocyanate prepolymers with sulphamic acid according to German Auslegeschrift No. 1,155,907 also results in relatively high molecular weight polyamines.

In addition to relatively high molecular weight polyamine compounds carrying the amino groups on aromatic residues (obtained from aromatic polyisocyanate), relatively high molecular weight polyamino compounds carrying amino groups on aliphatic residues may also be obtained (by way of aliphatic polyisocyanates).

Relatively high molecular weight aliphatic diamines and polyamines such as those obtained, for example, according to Belgian Patent No. 634,741 or U.S. Pat. No. 3,654,370 by reductive amination of polyoxyalkylene glycols with ammonia may also be used. Other relatively high molecular weight polyoxyalkylene polyamines may be prepared by one or other of the methods listed in the Company publication, "Jeffamines, Polyoxypropylene Amines" of Texaco Chemical Co., 1978. They may be prepared by the hydrogenation of cyanoethylated polyoxypropylene glycols (German Offenlegungsschrift No. 1,193,671); by amination of polypropylene glycol sulphonic acid esters (U.S. Pat. No. 3,236,895); by the treatment of a polyoxyalkylene glycol with epichlorohydrin and a primary amine (French Pat. No. 1,466,708); or by the reaction of isocyanate prepolymers with hydroxyl-containing enamines, aldimines or ketimines, followed by hydrolysis, according to German Offenlegungsschrift No. 2,546,536. Suitable relatively high molecular weight aliphatic diamines and polyamines also include the polyamines which may be prepared according to German Offenlegungsschriften Nos. 2,948,419 and 3,039,600 by alkaline hydrolysis of isocyanate prepolymers (with aliphatic diisocyanates) with bases via the carbamate stage. These relatively high molecular weight polyamines have molecular weights ranging from about 400 to 10,000, preferably from 500 to 6000 and most preferably from 1000 to 3000.

The long term storage-stable one-component reactive systems according to the invention may be prepared with the further addition of low molecular weight chain lengthening agents or cross-linking agents. These low molecular weight chain lengthening or cross-linking agents are difunctional or higher functional compounds which have hydroxyl groups attached to aliphatic and/or cycloaliphatic groups (polyols) and/or amino groups. They have molecular weights of from 60 to 399. Preferred among these compounds are low molecular weight diols having hydroxyl groups attached to aliphatic or cycloaliphatic groups, and aromatic diamines in the molecular weight range of from 108 to 399.

These compounds generally have 2 to 8, preferably 2 to 4, most preferably 2 isocyanate reactive hydrogen atoms, which may be in the form of hydroxyl groups and/or amino groups. Mixtures of various compounds may, of course, be used. The following are given as examples of such compounds: Ethylene glycol, trimethylene glycol, butanediol-(2,3) and/or -(1,4), hexanediol-(1,6), neopentyl glycol, 1,4-bis-hydroxyethyl-cyclohexane, 1,4-dihydroxycyclohexane, terephthalic acid-bis-(β-hydroxyethyl) ester, 1,4,3,6-dianhydrohexitols, 1,4-monoanhydrotetritols as well as the less preferred diols with secondary hydroxyl groups, e.g., propylene glycol, butanediol-(2,3) or pentanediol-(2,5). The following are examples of polyvalent compounds: Trimethylolpropane, trimethylolethane, hexanetriol-(1,2,6), glycerol, pentaerythritol, quinitol, mannitol, sorbitol, castor oil, di-, tri- and tetraethylene-, -propylene- and -butylene-glycols, bis-(2-hydroxyethyl)-hydroquinone, bis-(2-hydroxyethyl)-resorcinol, formose and formitol. Diols and polyols containing tertiary amines are also suitable, e.g., N-methyldiethanolamine, triethanolamine or N,N'-bis-hydroxyethylpiperazine.

Additional low molecular weight aromatic polyamines (preferably diamines) which have not been stabilized may also be used.

The term "aromatic polyamines" is used to include also those amines which carry the amino group attached to a heterocyclic group with an aromatic character. The following are examples of suitable aromatic polyamines: p-phenylenediamine: 2,4-/2,6-tolylenediamines; diphenylmethane-4,4'- and/or -2,4'- and/or -2,2'-diamines, 3,3'-dichloro-4,4'-diaminodiphenylmethane; 3-($C_1$–$C_8$)-alkyl-4,4'-diaminodiphenylmethanes; 3,3'-di-($C_1$–$C_4$)-alkyl-4,4'-diaminodiphenylmethanes; 3,3',5,5'-tetra-($C_1$–$C_4$)-alkyl-4,4'-diaminodiphenylmethanes; 4,4'-diaminodiphenyl-sulphides, -sulphoxides or -sulphones, diamines containing ether groups according to U.S. Pat. Nos. 3,654,364 and 3,736,295; 2-halogen-1,3-phenylenediamines optionally substituted in the 5-position (German Offenlegungsschriften Nos. 2,001,772, 2,025,896 and 2,065,869); bisanthranilic acid esters (German Offenlegungsschriften Nos. 2,040,644 and 2,160,590); 2,4-diaminobenzoic acid esters (German Offenlegungsschrift No. 2,025,900; and tolylenediamines substituted by one or two ($C_1$–$C_4$)alkyl groups. The following are particularly preferred; 3,5-diethyl-2,4- and/or -2,6-diaminotoluene (especially their commercial 80/20 or 65/35 isomeric mixtures); asymmetrically tetraalkyl substituted diaminodiphenylmethanes, e.g., 3,5-diethyl-3',5'-diisopropyl-4,4'-diaminodiphenyldimethane and their isomeric mixtures according to German Offenlegungsschrift No. 2,902,090; 4,4'-diaminobenzanilide; 3,5-diaminobenzoic acid-($C_1$–$C_4$)-alkyl esters; 4,4'- and/or 2,4'-diamino-diphenylmethane, and naphthylene-1,5-diamine.

Diols and diamines containing additional groups may also be used, e.g., adipic acid-bis-(2-hydroxyethyl)-esters, terephthalic acid-bis-(2-hydroxyethyl)-esters, diol-urethanes, diol-ureas, or polyols containing sulphonate and/or phosphonate groups, e.g., 1,6-diphenylmethane-bis-(2-hydroxyethylurea) or the adduct of sodium bisulphite and butanediol-(1,4) or the alkoxylation products thereof. Other low molecular weight compounds are fully described in German Offenlegungsschrift No. 2,854,384.

The following are examples of further chain lengthening agents or cross-linking agents which may optionally be included: ethylenediamine; propylenediaminer, hexane-1,6-diamine, 2,2,4-trimethyl-1,6-diaminohexane; 2,5-dimethyl-2,5-diaminohexane; 1,10decanediamine; 1,11-undecanediamine; 1,12-dodecanediamine; bis-aminomethyl-hexahydro-4,7-methano-indane (TCD-diamine); 1,3-cyclohexanediamine; 1,4-cyclohexanediamine; 1-amino-3,3,5-trimethyl-5-aminomethyl-cyclohexane (isophoronediamine); 2,4- and/or 2,6-hexahydrotolylenediamine; 2,4'- and/or 4,4'-diamino-dicyclohexylmethane; m- or p-xylylenediamine; bis-(3-aminopropyl)-methylamine; bis-N,N'-(3-aminopropyl)-piperazine and 1-amino-2-amino-methyl-3,3,5-(3,5,5)-trimethylcyclopentane; 2,2-dialkylpentane-1,5-diamines; 1,5,11-triaminoundecane; 4-aminomethyl-1,8-diaminooctane; lysine methyl ester; cycloaliphatic triamines according to German Offenlegungsschrift 2,614,244; 4,7-diethyl-1-methylcyclohexane and mixtures thereof; alkylated diamino-dicyclohexylmethanes, e.g., 3,3'-di-methyl-4,4'-diamino-dicyclohexylmethane or 3,5-diisopropyl-3',5'-diethyl-4,4'-diamino-dicyclohexylmethane; perhydrogenated diaminonaphthalenes; perhydrogenated diaminoanthracenes; diethylenetriamine; triethylenetetramine; pentaethylene hexamine; dipropylene triamine; tripropylene tetramine; N,N'-dimethyl-ethylenediamine; 2,5-dimethylpiperazine; 2-methylpiperazine; piperazine (hydrate); and 2-hydroxyethylpiperazine.

The following may also be used as low molecular weight chain lengthening agents; hydrazine, in most cases in the form of hydrazine hydrate, $C_1$–$C_6$-alkyl substituted hydrazines, e.g., methylhydrazine, ethylhydrazine, hydroxyethylhydrazine or N,N'-dimethylhydrazine. Other suitable chain lengthening agents include compounds containing hydrazide end groups, e.g., di- or polyhydrazides such as carbodihydrazide, hydracrylic acid hydrazide, oxalic acid dihydrazide, adipic acid dihydrazide, terephthalic acid hydrazide, isophthalic acid hydrazide of compounds containing hydrazide and semicarbazide, carbazic ester or amino groups, e.g., β-semicarbazidopropionic acid hydrazide, 2-semicarbazidoethylene-carbazic ester, aminoacetic acid hydrazide, β-aminopropionic acid hydrazide or bis-carbazic esters or bis-semicarbazides such as ethylene-bis-carbazic ester or ethylene-bis-semicarbazide or isophorone-bis-semicarbazide.

A proportion of from 0.01 to 10% by weight of compounds which are monofunctional in their reaction with isocyanates may, if desired, also be used in the usual manner as so-called chain breaking agents. Examples of such monofunctional compounds include monoamines such as butylamine or dibutylamine, stearylamine, pyrrolidone, 4-amino-2,2,6,6-tetramethylpiperadine, aniline or tolylamine; monohydric alcohols such as butanol, 2-ethyl-hexanol, cyclohexanol or ethyleneglycol monoethylester; monooximes such as butaneoxime or other monofunctional compounds, such as N,N-dimethylhydrazine or acetic acid hydrazide or benzoic acid hydrazide.

The catalysts optionally used for the long term storage-stable one-component systems according to the invention include the usual polyurethane catalysts, exceptionally advantageous effects being obtained with tertiary amines or metal catalysts. Examples of these catalysts include tertiary amines such as triethylamine, tributylamine, N-methyl-morpholine, N-ethyl-morpholine, N-cocomorpholine, N,N,N',N'-tetramethylethylenediamine, 1,4-diaza-bicyclo-(2,2,2)-octane, N-methyl-N'-dimethyl-aminoethyl-piperazine, N,N-dimethylbenzylamine, bis-(N,N-diethylaminoethyl)adipate, N,N-diethylbenzylamine, pentamethyl-diethylenmetriamine, N,N-dimethyl-cyclohexylamine, N,N,N',N'-tetramethyl-1,3-butanediamine, N,N-dimethyl-β-phenylethylamine, 1,2-dimethylimidazole and 2-methylimidazole. Examples of tertiary amines containing isocyanate reactive hydrogen atoms include triethanolamine, triisopropanolamine, N-methyl-diethanolamine, N-ethyl-diethanolamine, dimethylethanolamine and their reaction products with alkylene oxides such as propylene oxide and/or ethylene oxide.

Silaamines with carbon-silicon bonds as described, for example, in German Patent No. 1,229,290 may also be used as catalysts, e.g., 2,2,4-trimethyl-2-silamorpholine and 1,3-diethylaminomethyl-tetramethyl-disiloxane.

The catalysts used may also be bases containing nitrogen, such as tetraalkylammonium hydroxides, or alkali metal hydroxides such as sodium hydroxide, alkali metal phenolates such as sodium phenolate or alkali metal alcoholates such as sodium methylate. Hexahydrotriazines may also be used as catalysts.

Organic metal compounds may be used as catalysts, in particular organic tin compounds and lead compounds. The organic tin compounds used are preferably tin(II) salts of carboxylic acids, such as tin(II)-acetate, tin(II)-octoate, tin(II)-ethylhexoate and tin(II)-laurate, and the dialkyl tin salts of carboxylic acids, e.g., dibutyl tin diacetate, dibutyl tin dilaurate, dibutyl tin maleate or dioctyl tin diacetate.

Other examples of catalysts which may be used according to the invention and details concerning the action of the catalysts are described in Kunststoff-Handbuch, Volume VII, published by Vieweg and Höchtlen, Carl-Hanser-Verlag, Munich 1966, e.g., on pages 96 to 102, and in European Patent No. 3,230,757.

The catalysts are generally used in a quantity from about 0.001 to 10% by weight, based on the reactive mixture.

The following are auxiliary agents and additive which may optionally be used; dyes or pigments; fillers such as silica gel, gypsum, talcum, active charcoal, metal powder; UV absorbents or stabilizers such as phenolic antioxidants; light-protective agents; blowing agents; surface-active additives such as emulsifiers or foam stabilizers; cell regulators; anti-blocking agents; silicones; flame-protective agents; and fungistatic and/or bacteriostatic substances.

The fillers known may be fibrous materials, and include any known inorganic and/or organic fibrous reinforcing materials such as glass fibers, graphite fibers or asbestos fibers or fibrous material derived from organic polymers, e.g., from a polyester such as polyethylene terephthalate, or preferably from aromatic polyamides such as m-phenylene-/isophthalic acid polyamide or poly-p-phenylene-terephthalamide, or polycaprolactam. These fibrous materials may be used in the form of mats, bands, continuous fibers, fleeces, textiles or random mixtures of staple fibers. Glass fibers finished with sizes to impart an affinity for polyurethanes to the fibers are preferred. The quantity of filler to be incorporated depends on the particular improvement in mechanical properties required, and generally amounts to 5 to 60% by weight of fibrous material.

If polyurethane foams are to be produced, water and/or readily volatile organic substances are used as blowing agents. Suitable organic blowing agents include, for example, acetone, ethyl acetate, methanol, ethanol, halogenated alkanes such as methylene chloride, chloroform, ethylidene chloride, vinylidene chloride, monofluorotrichloromethane, chlorodifluoromethane and dichlorodifluoromethane, or butane, hexane, heptane or diethylether. The action of the blowing agent may also be obtained by the addition of compounds which decompose at elevated temperatures with liberation of gases, e.g., of nitrogen, e.g., azo compounds such as azoisobutyric acid nitrile. Other examples of blowing agents and details concerning the use of blowing agents are given in Kunststoff-Handbuch, Volume VII, published by Vieweg and Höchtlen, Carl-Hanser-Verlag, Munich 1966, e.g., on pages 108 and 109, 453 and 455 and 507 to 510.

Surface-active additives (emulsifiers and foam stabilizers) may also be used. Suitable emulsifiers include, for example, the sodium salts of ricinoleic sulphonates or of fatty acids or salts of fatty acids with amines, such as oleic acid diethylamine or stearic acid diethanolamine. Alkali metal or ammonium salts of sulphonic acids such as dodecylbenzene sulphonic acid or dinaphthylmethane disulphonic acid or of fatty acids as ricinoleic acid or of polymeric fatty acids may also be used as surface active additives.

Water-soluble polyether siloxanes are the main foam stabilizes used. These compounds generally have the structure of a copolymer of ethylene oxide and propylene oxide with a polydimethylsiloxane group attached thereto. Foam stabilizers of this type have been described, e.g., in U.S. Pat. No. 2,764,565.

Other examples of additives optionally used according to the invention, including surface-active additives, foam stabilizers, cell regulators, reaction retarders, stabilizers, flame retarding substances, plasticizers, dyes, fillers and fungistatic and bacterisotatic substances, and details concerning the use of mode of action of these additives may be found in Kunststoff-Handbuch, Volume VI, published by Vieweg and Höchtlen, Carl-Hanser-Verlag, Munich 1966, e.g., on pages 103 to 113, and in German Offenlegungsschriften Nos. 2,854,384 and 2,920,501.

The (one-component) polyurethane reactive mixtures obtained may be readily pourable at room temperature. They may be capable of being spread with a doctor knife or they may be solid but easily melted, depending on the viscosity or melting properties of the starting components. These reactive mixtures constitute a heterogeneous suspension of the solid, stabilized amines in the polyol and/or polyamine components and the polyisocyanates or isocyanate prepolymers. Cross-linking of these mixtures in heat may, if desired, be accelerated by the addition of suitable catalysts. If polyamine compounds, which are markedly more reactive towards isocyanate groups, are used on their own, the addition of catalyst may be omitted.

Another feature of the one-component polyurethane-reactive systems is that these systems which have been stabilized according to the invention undergo cross-linking within a few minutes after reaching a certain temperature (which depends upon the quantity and nature of the stabilizer isocyanate). This means that below this temperature ("thickening temperature"), the hot molding tool can be completely filled with the as yet uncross-linked reactive mixture even if the flow path is very long. The subsequent rapid solidification of the casting mixture ensures that the product can be rapidly released from the mold once the temperature has been raised. Another advantage of the invention is that the starting reactive systems can be stored for a very long time even at relatively high temperatures (e.g., up to 60° C.). Another advantage compared with the state of the art, where the reaction of one-component systems can only be delayed by a "heterogeneity" of one or more components, is that the delay is considerably improved by the protection provided by encapsulation with polyadduct, which "protection" can only be eliminated by heat shock (or shearing forces or partial dissolving of the capsules by means of highly polar solvents).

The polyamine suspensions according to the invention considerably increase the possible range of uses of one-component systems. One essential feature of the one-component systems according to the invention is that solid aromatic diamines (such as 4,4'-diaminodiphenylmethane, 2,4- or 2,6-diaminotoluene, 1,5-diaminonaphthalene or 3,3',5,5'-tetramethyl-4,4'-diaminodiphenylmethane) may also be used in these systems as stabilized chain lengthening agents with retarded reactivity without impairing the character of a one-component system. If, on the other hand, these diamines are reacted in an unstabilized form with isocyanate prepolymers by one of the methods hitherto conventionally employed, then the casting times are in some cases very much shorter so that the reaction mixtures cannot flow freely in the molding tool.

The polyurethane one-component reactive systems according to the invention, which optionally contain catalysts, are mainly solidified by heat. It is surprisingly found that no cross-linking reaction takes place at room temperature or slightly elevated temperature even in the presence of powerful catalysts, so that even mixtures containing catalysts may be described as long term storage-stable one-component systems.

The methods employed for working up the one-component systems according to the invention depend on the nature of the systems. Liquid systems which can be cast at room temperature may be worked up by a casting process, optionally after they have been briefly heated, e.g., to 50°-70° C. The systems may also be worked up by centrifugal casting. Hollow bodies may be produced by introducing the reactive mass into heated molds in which they are distributed over the surface by suitable rotating movements.

The reactive mass may also be introduced into heated molds to be worked up by the slush molding process. After a certain heating and reaction time on the heated surface of the mold, excess reaction mass which has not undergone reaction is poured out of the molds.

If blowing agents are used, cellular polyurethanes, optionally having an integral skin structure, may be produced.

Systems which can no longer be cast but still have some flow may be applied to the desired supports, e.g., textile supports such as fleeces, woven or knitted fabrics, (split) leather, matrices (e.g., suede leather-silicone matrices) or temporary supports (e.g., separating paper), e.g., by means of a doctor wiper, to form coatings or finishes which are then solidified by heat.

Plastic systems (pastes) may be molded under heat and pressure, 5 to 15 minutes at 120° C. being sufficient for solidification.

Surface coatings, impression forms or molded bodies may also be produced by dip molding, in which the heated molds which are required to be coated are dipped into the reactive mass.

The reactive mass may also be extruded into hot media (hot air or hot liquids) through slots or dies and thereby solidified. In heated extruders, the reactive mass may react to be partially or substantially converted into the polyurethane and be extruded in this form through slots or dies, optionally into hot media in which they complete their reaction or into hot molds from which they may be released after a short time. The reactive mass may also be worked up by reaction injection molding (i.e., the RIM process).

Solid systems, in particular to those based on relatively high melting starting polyols (45° to 65° C.) are either shaped under pressure (injection molding) or worked up at or above the melting point of the polyol. In such cases, the previously prepared one-component system may be introduced in the form of a solid granulate into a mold which has been heated to a temperature above the melting point of the polyol (generally to a temperature below 60° C.). When the granulate has melted and thus filled the mold, the mold is heated to a temperature of 100° to 140° C., so that the contents solidify.

The solidification temperature of the one-component systems according to the invention depend on the quantity and chemical constitution of the polyisocyanates used for stabilizing the polyamines. The solidification time required for forming the polyurethanes decreases with increasing solidification temperature. The complete heating time may vary from less than one minute to several hours, depending on the temperature. It is sometimes advantageous to temper the polymer products for some time at 100° C. after their removal from the mold in order to ensure complete curing.

Curing of the one-component reactive systems may, however, also be carried out by the addition of preferably highly polar solvents such as dimethylformamide or N-methylpyrrolidone or only moderately polar solvents such as propylene carbonate, dioxane or glycol monomethyl ether acetate. The stabilizing effect in the one-component systems may be partly or completely eliminated, depending on the quantity of these solvents. The casting time (pot life) of such reaction mixtures may be controlled by the quantity of such solvents added. If only small quantities are added, the systems obtained have a pot life of several days at room temperature, whereas the addition of larger quantities of such solvents results in rapid or even sudden solidification after only 10 to 15 minutes.

The quantity of such solvents added also depends on the quantity and nature of the stabilizer (quality of the polyadduct skin on the polyamine surface) and is determined for a particular system on the basis of preliminary tests. The technical advantage of such reaction mixtures is that the systems solidify even without the application of heat. The time required for solidification of the one-component systems by heat can, of course, be reduced by the addition of suitable quantities of these solvents while still ensuring sufficient stability in storage.

Solidification of the one-component systems according to the invention may also be obtained by the application of high shearing forces, e.g., in high speed stirrers. The rise in temperature obtained as a result of brief stirring is generally not sufficient to reach the thickening and cross-linking temperature of the one-component systems, so that the effect is produced by the destruction of the polyurea skin on the surface of the polyamine particles due to the mechanical action of the stirring process.

Other methods of stabilization under various conditions and processes for preparing the one-component reactive systems and curing them may be found in the examples.

It is preferred to use those polyurethane reactive systems which contain relatively high molecular weight polyamines as components and therefore give rise to high quality elastomers, coatings, cellular elastomers and molded parts, optionally with the density distribution of a cellular internal core and denser outer skin.

The invention is further illustrated, but is not intended to be limited by the following examples in which all parts and percentages are by weight unless otherwise specified.

EXAMPLE 1

Polyisocyanate X mentioned below is added in the quantity indicated to a suspension of 7.25 g (45.8 mMol) of powdered 1,5-diaminonaphthalene (NDA) (particle size 10 to 50 μm) in 20 g of dioctylphthalate. The reaction mixture is stirred for several hours at room temperature to form the stabilized diamine with retarded reactivity. 100 g of an isocyanate-containing prepolymer (NCO = 3.6% by weight) prepared in known manner from a linear polypropylene glycol ether (molecular weight 2000, OH number 56) and 2,4-diisocyanatotoluene are then added. Polyaddition of the two components then takes place ($NH_2$/NCO reaction). The viscosity of the reaction mixtures is observed to increase at room temperature at rates which differ according to the extent of inactivation of the NDA particles due to polyurea formation on the surface.

The point in time at which the viscosity of the reaction mixtures reaches 40,000 mPas is determined.

| Reaction mixture: | 20.00 g | dioctylphthalate |
|---|---|---|
| | 7.25 g | NDA |
| | 2.8 mMol | diisocyanate (or corresponding quantity of triisocyanate) (6.1 equivalents % of isocyanate to 1 equivalent of amine) |
| | 100.00 g | NCO prepolymer (NCO = 3.6%) |

| No. | Polyisocyanate X | Quantity/g | Time when 40,000 mPas is reached |
|---|---|---|---|
| (a) | — | — | 1 h 30 min (comparison) |
| (b) | 2,4-diisocyanatotoluene (TDI) | 0.5 | 1 h 55 min |
| (c) | 4,4'-diisocyanatodiphenylmethane | 0.7 | 1 h 40 min |
| (d) | Isophorone diisocyanate (IPDI) | 0.6 | 2 h 30 min |
| (e) | Biuretized 1,6-diisocyanatohexane (Desmodur ® N) | 1.0 | 3 h 45 min |

(Desmodur ® N: Product of BAYER AG, D-5090 Leverkusen)

The inactivating influence of the polyisocyanates on the $NH_2$/NCO reaction is clear from this test series, especially when IPDI and biuretized 1,6-diisocyanatohexane are used and compared with the blank test (No. a).

The reaction mixtures can be cured to form elastomeric polyurethane(urea)s by one hour heating at 135° to 140° C.

EXAMPLE 2

A solution of 7.5 g of trimerized IPDI (NCO=14.8%) in 5 g of toluene is added to a suspension of 40 g of 1,5-diaminonaphthalene (NDA) in 50 g of a linear polypropylene glycol ether (molecular weight 2000, OH number 56) (corresponds to the addition of 5.2 equivalent % of isocyanate to one equivalent of amine) at room temperature with vigorous stirring. After 4 to 5 hours stirring, 14 g of the resulting suspension of stabilized diaminonaphthalene were vigorously stirred together with 100 g of the isocyanate prepolymer described in Example 1. The viscosity gradually rises at room temperature and a viscosity of 40,000 mPas is obtained after 65 minutes.

An elastomeric polyurethane urea is obtained by heating the reactive mixture to 130° C.

EXAMPLE 3

(Comparison Experiment)

When 100 g of the isocyanate prepolymer mentioned in Example 1 are mixed with 14 g of a suspension of 40 g of NDA in 50 g of the linear polypropylene glycol in which the 1,5-diaminonaphthalene has not been inactivated by the addition of trimeric IPDI, a viscosity of 40,000 mPas is obtained after only 21 minutes.

By comparison with Example 2 (inactivated NDA), polyaddition of the starting components takes place at a significantly higher speed (factor ~3).

EXAMPLE 4

The following polyisocyanates X were added in the given quantity to a suspension of 50 g of 2,4-diaminotoluene (TDA) in 50 g of a linear polypropylene glycol ether (molecular weight 2000, OH number 56). After several hours stirring at slightly elevated temperature (up to 50° C.), 10.5 g of the now inactivated TDA/polyether suspension cooled to room temperature were vigorously mixed with 100 g of the isocyanate prepolymer (NCO=3.6%) described in Example 1. A gradual increase in viscosity takes place at room temperature. The time required to reach 10,000 and 40,000 mPas/RT is taken as a measure of the isocyanate reactivity of the inactivated TDA.

| Reaction mixture: | 50 g | TDA |
|---|---|---|
| | 50 g | polyether (molecular weight 2000) |
| | Y g | of polyisocyanate X |

| Experiment | Polyisocyanate X | Quantity/g (Y) | Equivalent % NCO per equivalent of amine | Time (min) taken to reach a viscosity of 10,000 mPas | Time (min) taken to reach a viscosity of 40,000 mPas |
|---|---|---|---|---|---|
| a | — | — | 0 | 4 | 12 (comparison) |
| b | biuretized 1,6-diisocyanatohexane (N) | 3.4 | 2.15 | 17 | 28 |
| c | biuretized 1,6-diisocyanatohexane (N) | 6.8 | 4.3 | 32 | 51 |
| d | IPDI | 3.83 | 4.3 | 57 | 85 |
| e | " | 7.66 | 8.6 | 53 | 82 |
| f | adduct of 3 mol tolylene-2,4-diisocyanate with trimethylol propane | 12.5 | 4.3 | 10 | 28 |

This example also clearly demonstrates the inactivating influence on the NCO/NH₂ reaction, especially when IPDI and biuretized 1,6-diisocyanatonexane are used.

The above-mentioned reaction mixtures in some cases have a considerably longer casting time (pot life) than the comparison sample (No. a).

EXAMPLE 5

Biuretized 1,6-diisocyanatohexane (NCO=22.5%) was added in the quantities given in the Table below to a suspension of 40 g of 1,5-diaminonaphthalene (NDA) in 50 g of a linear polypropylene glycol ether (molecular weight 2000, OH number 56). After 4 to 5 hours stirring at 30° to 50° C., 14 g of the resulting suspension (6.2 g of inactivated NDA and 7.8 g of polyether as suspension medium) were mixed with 100 g of the isocyanate prepolymer of Example 1 (NCO=3.6%).

The cross-linking temperature of the reaction mixture is then determined as a measure of inactivation of the NDA present in heterogeneous phase. For this purpose, a thin film of the reaction mixture is applied to a KOFLER heating bench over a temperature range of from 40° to 250° C. The minimum temperature at which this film begins to undergo elastic cross-linking is determined after 15 minutes. It has been found in practice that if this cross-linking temperature is above 50°-60° C., the reaction mixture is stable in storage for many months and its viscosity remains constant after 1-2 days (after the small quantities of polyether present in the NDA suspension have reacted with the isocyanate prepolymer).

| Reaction mixture: | 40 g | NDA |
| --- | --- | --- |
| | 50 g | polyether (linear, molecular weight 2000) |
| | Y g | biuretized 1,6-diisocyanatohexane. |

| | Quantity of biuretized 1,6-diisocyan-atohexane (g) (Y) | Equivalents % of isocyanate per equivalents of amine | Cross-linking temperature °C. |
| --- | --- | --- | --- |
| (a) | — | — | 50 (Comparison) |
| (b) | 0.5 | 0.53 | 65 |
| (c) | 1.7 | 1.8 | 135 |
| (d) | 2.5 | 2.65 | 160 |
| (e) | 3.0 | 3.2 | 165 |
| (f) | 3.5 | 3.7 | 165-170 |

If the liquid reaction mixture indicated under (c), which is stable in storage at room temperature with exclusion of moisture, is poured into a mold coated with mold release agent ˣ after brief degasification under vacuum and is heated at 140° C. for 1 to 2 hours, a highly elastic polyurethane elastomer having the following mechanical properties is obtained:

| Hardness (Shore A) | 83 (DIN 53 505) |
| --- | --- |
| Tensile strength (MPa) | 8.9 (DIN 53 504) |
| Elongation at break (%) | 450 (DIN 53 504) |
| Tear propagation resistance (kN/m) | 20.5 (DIN 53 515) |
| Elasticity (%) | 60 (DIN 53 512) |

ˣ mold release agent: a polysiloxane as sold as Trennmittel V by BAYER AG, D-5090 Leverkusen/West Germany

EXAMPLE 6

When 14 g of the inactivated NDA/polyether suspension described in Example 5 are stirred at 50°-60° C. with 100 g of an isocyanate prepolymer obtained from 2,4-diisocycnatotouluene and a polyester with a molecular weight of 2000 (OH number 56) based on adipic acid and ethylene glycol (isocyanate content of prepolymer=3.6% by weight), the reaction mixtures obtained have the following cross-linking temperatures (KOFLER bench method, see Example 5):

| | Biuretized 1,6-diisocyanatohexane (g) | Cross-linking temperature (°C.) |
| --- | --- | --- |
| (a) | — | 40 (comparison) |
| (b) | 0.5 | 50 |
| (c) | 1.7 | 120 |
| (d) | 2.5 | 150 |
| (e) | 3.0 | 160 |
| (f) | 3.5 | 160-170 |

In this case, again, reaction mixtures (c) to (f) are found to be stable in storage at room temperature with exclusion of moisture. If the reaction mixture described under (c) (cross-linking temperature 120° C.) is cross-linked by heat under the conditions mentioned in Example 5, a polyurethane elastomer having the following mechanical properties is obtained:

| Hardness (Shore A) | 81 |
| --- | --- |
| Tensile strength (MPa) | 27.7 |
| Elongation at break (%) | 550 |
| Tear propagation resistance (kN/m) | 42 |
| Elasticity (%) | 52 |

EXAMPLE 7

1.5 g of biuretized 1,6-diisocyanatohexane are added to a suspension of 40 g of finely powdered 4-aminobenzoic acid-(4-aminoanilide) (4,4'-diaminobenzanilide) in 50 g of the linear polypropylene glycol ether (OH number 56). Stirring of the reaction mixture is then continued for 3 to 5 hours at room temperature.

(a) 22 g of this suspension were mixed with 100 g of the isocyanate prepolymer of Example 5 (NCO=3.6) (Example 5). The reaction mixture is found to be stable in storage at room temperature and to have a cross-linking temperature of 120°-125° C. on the KOFLER bench. When the liquid mixture is heated to a temperature of 130°-140° C. after brief degasification under vacuum, a polyurethane elastomer which is free from blisters and has the following mechanical properties is obtained after 1 to 2 hours:

| Hardness (Shore A) | 80 |
| --- | --- |
| Tensile strength (MPa) | 10.5 |
| Elongation at break (%) | 350 |
| Tear propagation resistance (kN/m) | 28.5 |
| Elasticity (%) | 55 |

(b) When the isocyanate prepolymer based on polyether is replaced by a corresponding isocyanate prepolymer based on polyester (polyester of adipic acid and ethylene glycol, molecular weight 2000, OH number 56), a polyurethane system which is also stable in storage at room temperature is obtained when this prepolymer is mixed with 22 g of the above-mentioned 4,4′-diaminobenzanilide/polyether suspension per 100 g of isocyanate prepolymer (NCO=3.6%). This polyurethane system may be converted into a pourable state by melting (50°-60° C.) before it is worked up (cross-linking temperature: 115°-120° C.). The polyurethane elastomer produced under the operating conditions already mentioned (1 to 2 hours at 130°-140° C.) has the following mechanical properties:

| Hardness (Shore A) | 80 |
| Tensile strength (MPa) | 23 |
| Elongation at break (%) | 370 |
| Tear propagation resistance (kN/m) | 42 |
| Elasticity (%) | 48 |

EXAMPLE 8

(Comparison Experiment)

When the suspension of 40 g of 4,4′-diaminobenzanilide in 50 g of a linear polypropylene glycol ether described in Example 7 is used but without the addition of 1.5 g of biuretized 1,6-diisocyanatohexane, the following casting times (pot lives) are obtained with the isocyanate prepolymers described under 7a and 7b;
(a) 100 g of isocyanate prepolymer based on polyether 22 g of suspension (not activated) Casting time at room temperature=15-25 minutes, i.e., the reaction mixture can no longer be worked up by the usual casting processes after this time.
(b) 100 g of isocyanate prepolymer based on polyester 22 g of suspension (not activated) Casting time at 70-80° C.: 5 to 10 minutes.

EXAMPLE 9

4 g of isophorone diisocyanate (IPDI) were added to a suspension of 40 g of ethylene glycol-bis-(p-aminobenzoic acid ester) in 50 g of a linear polypropylene glycol ether (molecular weight 4000, OH number 28). After the reaction mixture had been left to stand at room temperature for one day, 26 g of this suspension were mixed with 100 g of an isocyanate prepolymer based on a polypropylene glycol ether (molecular weight 2000, OH number 56) and 2,4-diisocyanatotoluene (NCO =3.6% by weight). The reaction mixture was then found to be stable in storage at room temperature (with exclusion of moisture) but solidified after a few hours at a temperature of 120°-130° C. After a tempering time of 24 hours at 110° C., the following mechanical properties were determined on a sample plate:

| Hardness (Shore A) | 65 |
| Tensile strength (MPa) | 6.5 |
| Elongation at break (%) | 650 |
| Tear propagation resistance (kN/m) | 12.5 |
| Elasticity (%) | 35. |

Without the inactivating addition of IPDI, the casting time of the above combination is about 120 minutes at room temperature.

EXAMPLE 10

4 g of IPDI were added to a suspension of 40 g of 4,4′-diamino-3,3′-dicarboxymethyl-diphenylmethane in 70 g of a linear, high molecular weight polypropylene glycol ether (molecular weight 4000, OH number 28). After several hours stirring at 30°-50° C., 35 g of this suspension were mixed with 100 g of the isocyanate prepolymers of Example 7(b) (NCO=3.6%). The crosslinking temperature of this reaction mixture is 110°-120° C. The viscosity of the reaction mixture remains constant after 1 to 2 days. Solidification does not take place until heat of 120°-130° C. is applied. An elastic polyurethane material having a Shore A hardness of 72 is obtained.

Without the stabilizing addition of 4 g of IPDI, the suspension (35 g) in combination with the isocyanate prepolymer (100 g) has a casting time of 2-3 hours at room temperature. The reaction mixture is therefore not stable in storage at room temperature.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A process for the production of solid polyamines stabilized by a polyadduct covering and showing retarded reactivity comprising reacting
   (1) one or more solid organic polyamines in particulate form, said polyamines containing at least two primary and/or secondary amino groups and having melting points above 50° C., and
   (2) from 0.1 to 25 equivalent % of isocyanate per amine equivalent of a water insoluble, difunctional and/or higher functional polyisocynate,
said reaction being conducted at a temperature below the melting point of said solid polyamine, and being conducted in the presence of
   (3) a liquid medium selected from the group consisting of organic compounds containing two or more hydroxy groups and having molecular weights of from 62 to 10,000,
to form a suspension of polyadduct-covered stabilized polyamines in the liquid medium.

2. The process of claim 1 wherein the liquid medium additionally includes an apolar or slightly polar solvent.

3. The process of claim 2, further including the step of isolating the stabilized polyamines from said liquid medium.

4. The process of claim 3, further comprising the step of suspending the isolated, stabilized polyamines in a compound selected from the group consisting of (i) organic compounds containing two or more hydroxy groups and having molecular weights of from 62 to 10,000, (ii) organic compounds containing two or more amino groups and having molecular weights of from 60 to 10,000, and (iii) mixtures thereof.

5. The process of claim 1, further comprising adding to said suspension a compound selected from the group consisting of (i) organic compounds containing two or more hydroxy groups and having molecular weights of from 62 to 10,000, (ii) organic compounds containing two or more amino groups and having molecular weights of from 60 to 10,000, and (iii) mixtures thereof.

6. The process of claim 1, characterized in that said polyamines are aromatic, diprimary diamines.

7. The process of claim 1, characterized in that the polyisocyanates used are water-insoluble polyisocyanates having an average functionality of more than 2.1 and molecular weights of up to 850.

8. The process of claim 1, characterized in that said water-insoluble polyisocyanates contain one or more of the following groups; uretdione, biuret, isocyanurate, allophanate, carbodiimide and urethane.

9. The process of claim 1, characterized in that aliphatic, cycloaliphatic or araliphatic difunctional and/or higher functional polyisocyanates are used.

10. The process of claim 1, characterized in that aromatic polyisocyanates having NCO functionalities above 2.1 are used, which polyisocyanates are isocyanate prepolymers derived from higher than difunctional polyols or polyol mixtures, which isocyanate prepolymers are based on toluene diisacyanate, diphenylmethane diisocyanate or trimers thereof, or mixed trimers of said diisocyanates with aliphatic diisocyanates.

11. Stabilized, solid, finely divided polyamines with retarded activity which have a polyadduct covering prepared by partial surface reaction with water-insoluble, difunctional and/or higher functional polyisocyanates, which polyamines have a residual amino group content of from at least 75% to less than 99.9% of the amino groups originally present in the unstabilized polyamine, suspended in relatively high molecular weight polyhydroxyl compounds having molecular weights of from 62 to 10,000 and/or relatively high molecular weight polyamino compounds having molecular weights of from 32 to 10,000.

12. In the process of producing polyurethanes from
(A) low molecular weight and/or relatively high molecular weight compounds containing isocyanate reactive groups,
(B) low molecular weight and/or relatively high molecular weight polyisocyanates and/or isocyanate prepolymers, which isocyanates may be partly or completely present in a blocked form,
(C) optionally polyurethane catalysts and
(D) optionally other auxiliary agents and/or additivies of the improvement wherein component A comprises the suspension of polyadduct-covered stabilized polyamines produced according to the process of claim 1.

13. The process of claim 1, wherein the liquid medium additionally includes at least one plasticizer and/or water.

* * * * *